April 28, 1964

J. P. LEKAS 3,131,395

AIR-SPACED MAGNETIC DISC RECORDER

Filed April 2, 1954

*INVENTOR.*
JOHN P. LEKAS

*BY* William R. Lane

ATTORNEY 3,131,395

AIR-SPACED MAGNETIC DISC RECORDER

John P. Lekas, Hollywood, Calif., assignor, by mesne assignments, to Alwac International, Nassau, Bahamas, a corporation of Panama Filed Apr. 2, 1954, Ser. No. 420,699
11 Claims. (Cl. 346—74)

This invention relates to a magnetic disc recorder in which an air bearing is developed between the recording disc and the magnetic disc.

Considerable difficulty is experienced in magnetic disc recorders in obtaining satisfactory storage devices. It is difficult to obtain suitable space relationship between the recording heads and the magnetic disc and to maintain them in this spaced relationship during recording or reading periods.

In a magnetic disc recorder, it is necessary that precise spacing be maintained between a recording head disc and the receiving disc, otherwise spurious effects will occur such as variation in amplitude of the recorded signal. For economy and ease of construction, it is desirable that this close spacing is acquired by means other than precise construction and adjustment. In order to acquire maximum recording efficiency, the recording heads should lie in close proximity to the recording medium on the rotating disc. In addition to precise construction, some form of suitable compensation is, ordinarily, necessary to account for expansion and contraction under various operating temperatures. An important feature of a recording system is that it cannot be considerably affected by mechanical vibration. Also, the normal aging and wear of parts in the disc recorder should not cause malfunctioning.

Developing an air bearing as taught herein, between the recording disc and the receiving disc, solves many of the above-mentioned problems.

It is therefore an object of this invention to provide an improved magnetic disc recorder.

Another object of this invention is to provide a magnetic disc recorder utilizing an air bearing between the head plate and the magnetic disc.

Another object of this invention is to provide a disc recorder that is economical in construction that requires a minimum of precision construction and adjustment.

Still another object of this invention is to provide a magnetic disc recorder which does not require high quality bearings.

Further objects of this invention will become apparent from the following description taken in connection with the accompanying drawings, in which FIG. 1 is a schematic of the device;

Figures 1, 2, 3, 4:
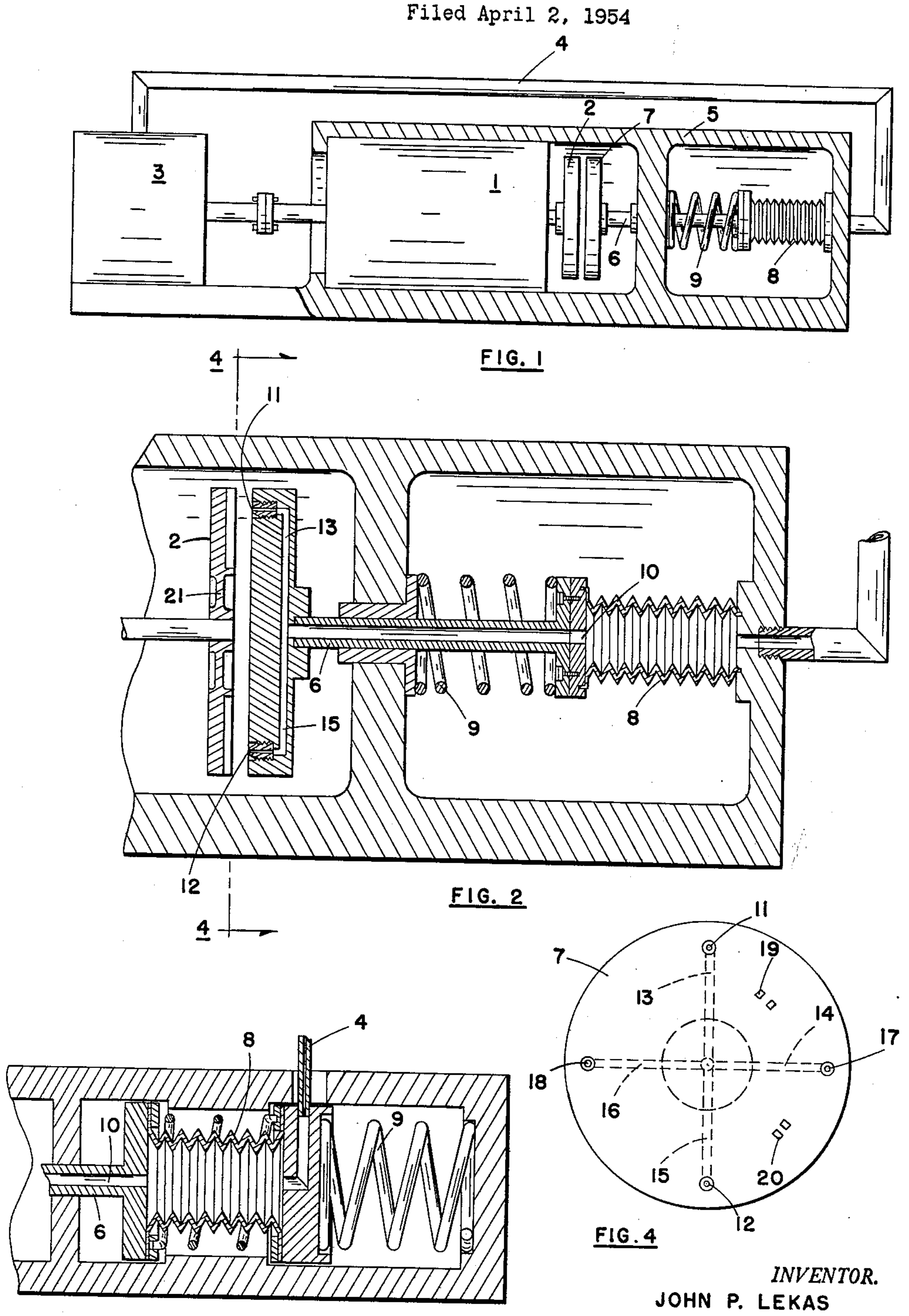
FIG. 2 is a cross section showing how head plate thrust is obtained.
FIG. 3 is an alternate arrangement of bellows and spring.
FIG. 4 is a front view of the recording disc.

Referring to FIG. 1, a motor 1 rotates a disc 2 having a thin, uniform layer of retentive magnetic material on the face thereof. It also rotates a pump 3 providing pressure in an airline 4. A mounting frame 5 provides structural mounting means for motor 1 and shaft 6 upon which is located head plate, or disc, 7. A bellows 8 connected to airline 4 acts against the pressure of spring 9 to thrust shaft 6 and disc 7 closely to disc 2. It is contemplated that magnetic heads be mounted in milled holes in disc 7 and the pole faces of the magnetic heads be flush with the surface of disc 7 in order that magnetic writing can be obtained on disc 2.

In FIG. 2, a channel 10 commences at bellows 8 and extends through shaft 6 to disc 7 where it connects to four radial channels of which 15 and 13 are visible. Jet orifices 11 and 12 allow the air to escape and form a layer of air under pressure between discs 2 and 7, which layer of air acts to keep the rotating disc and the head plate from direct contact. Each of these orifices may be replaced by several smaller orifices at each location.

FIG. 3 illustrates an alternate arrangement of bellows and spring. In this embodiment, a self-collapsing bellows lies between the spring and the shaft which is to be thrust into position. As the bellows expand due to air pressure, spring 9 and shaft 6 are forced farther apart. Thus, the expansion of bellows 8 provides a differential action to force the discs into close relationship.

In FIG. 4 are shown radial channels 13, 14, 15 and 16 having orifices 11, 12, 17 and 18. The pole faces 19 and 20 of magnetic heads are shown also.

In operation, as motor 1 commences to turn, pump 3 builds up pressure which acts to expand bellows 8, contract spring 9, and force disc 7 closely against disc 2 where the discs are held apart by a layer of air escaping from the orifices in disc 7. The gap between discs 7 and 2 is determined primarily by the air pressure built up in line 4, dimensions of the bellows, characteristics of the spring, and size and position of the jet orifices. In case of loss of air pressure which no longer holds discs 7 and 2 apart, disc 7 will be retracted, due to the collapsing of bellows 8. This is a desirable safety feature in order to prevent one disc from actual contact with the other.

Inasmuch as the thrust bearing surface is developed between the magnetic disc and the disc 7, which may also be termed a "head plate," effects due to thermal expansion of the metals or wearing of the bearings are relatively unimportant. Disc wobble is less likely to occur because the thrust bearing is developed evenly around the disc. In addition, a web on either of the two discs, such as web 21 on disc 2 allows sufficient flexing to maintain uniform spacing between the discs. In other words, this particular bearing spacing provides, at the same time, the uniform small recording gap requisite for disc recording.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a magnetic disc recorder, a first disc adapted to be rotated relative to a second disc, magnetic heads disposed in one of said discs, a magnetic medium disposed on the other of said discs, one of said discs having a flexible web and adapted to assume a position in close proximity with the other of said discs and means disposed at a radial position in one of said discs for ejecting air under pressure between said discs whereby said discs are held apart in spaced relationship.

2. In a magnetic disc recorder, two discs disposed oppositely to each other, one of said discs being adapted to be rotated, one of said discs having a flexible web the first of said discs having a plurality of magnetic heads disposed therein, the second of said discs having a retentive magnetic material disposed on the face thereof, means for thrusting one of said discs into a position of close proximity to the other of said discs, jet orifice means disposed in the face of one of said discs, conduit means disposed in the same disc to provide connection to jet orifices in said disc, and means for forcing air under pressure through said conduit means whereby said discs are held apart in spaced relationship.

3. In a magnetic disc recorder, a pair of discs oppositely disposed with respect to each other, one of said discs having a retentive magnetic material on the face thereof, the other of said discs having at least one magnetic head disposed therein, means for rotating one of said discs relative to the other, one of said discs having a flexible web means for thrusting the other of said discs into a position of close proximity with said first disc, air conduit means radially disposed in said thrust disc, an orifice means connected to said conduit means and directed so as to eject air under pressure between said discs whereby said discs are held apart in spaced relationship.

4. In a magnetic disc recorder, a pair of discs oppositely disposed with respect to each other, one of said discs having a retentive magnetic material on the face thereof, the other of said discs having at least one magnetic head disposed therein, means for rotating the first of said discs relative to the second, air pressure means for thrusting one of said discs into position of close proximity with the other of said discs, conduit means disposed in said second disc, and jet orifice means connected to said conduit means and directed so as to force air under pressure between said discs.

5. In a magnetic disc recorder, first and second discs oppositely disposed with respect to each other, means for rotating said first disc with respect to the other, a retentive magnetic material disposed on one of said discs, at least one magnetic head disposed on the other of said discs, thrust means for said second disc comprising a bellows, spring means opposing said bellows, conduit means within said second discs, a plurality of orifices connected to said conduit means and directed so as to eject air between said discs, air pressure means connected to said bellows and said conduit means.

6. In a magnetic disc recorder, a pair of discs oppositely disposed with respect to each other, means for rotating one disc with respect to the other, a retentive magnetic material disposed on one of said discs, magnetic heads disposed in the other of said discs, a pump operated by said means for rotating said discs, conduit means connected to said pump, a bellows connected to said conduit means and disposed to thrust said second disc into a position of close proximity with said first disc, spring means for collapsing said bellows, conduit means from said bellows to said second disc, and orifice means disposed in said second disc to allow air under pressure to be forced between said discs.

7. In the combination of a transducer unit with a rotatable disc intelligence storage unit having a moving surface wherein the efficiency of intelligence transfer is dependent upon the spacing therebetween, means for providing a constant spacing between said units comprising; a support, one of said units being reciprocably mounted on said support, a first means responsive to fluid pressure connected to said one unit for urging said units together when fluid pressure is applied, a second means responsive to fluid pressure carried by said transducer unit for urging said units apart when fluid pressure is applied, and means operative to separate said units when fluid pressure is not applied.

8. In a magnetic disc recorder having a transducer and a record disc, the combination of means including a source of fluid at a super atmospheric pressure for applying a pressurized fluid film between said transducer and said record disc with means for applying a force to compress said film and means operative to separate said transducer and record disc when said pressurized fluid film is not applied between said transducer and said record disc.

9. The combination defined in claim 8 wherein said transducer is mounted on a movable body, said fluid film applying means including jet orifice means disposed in the face of said member, conduit means connected to said source and disposed in part in said member to provide a connection from said source to said jet orifice means, said fluid film constituting the sole material medium maintaining separation between the face of said member and the record disc during normal operation.

10. The combination defined in claim 8 wherein said last name means includes a fluid pressure responsive element connected for response to the pressure of fluid at said source and operative upon reduction in the pressure at said source below a predetermined norm to render said transducer and record disc separating means operative.

11. The combination defined in claim 1 wherein said discs are substantially circular and coaxially arranged at least during normal recording operation.

References Cited in the file of this patent

UNITED STATES PATENTS

| | | |
|---|---|---|
| 2,144,844 | Hickman | Jan. 24, 1939 |
| 2,612,566 | Anderson | Sept. 30, 1952 |
| 2,671,700 | Seyffert | Mar. 9, 1954 |
| 2,683,636 | Wilcox | July 13, 1954 |